(12) United States Patent
Karaki

(10) Patent No.: US 11,714,007 B2
(45) Date of Patent: Aug. 1, 2023

(54) TEMPERATURE INTERPOLATION DEVICE

(71) Applicant: FANUC CORPORATION, Yamanashi (JP)

(72) Inventor: Shunsuke Karaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 26 days.

(21) Appl. No.: 16/814,173

(22) Filed: Mar. 10, 2020

(65) Prior Publication Data
US 2020/0292394 A1    Sep. 17, 2020

(30) Foreign Application Priority Data

Mar. 15, 2019  (JP) .................................. 2019-048473

(51) Int. Cl.
*G01K 3/04*   (2006.01)
*G01K 15/00*  (2006.01)
*G01K 1/022*  (2021.01)
*G06F 17/17*  (2006.01)

(52) U.S. Cl.
CPC ............... *G01K 3/04* (2013.01); *G01K 1/022* (2013.01); *G01K 15/007* (2013.01); *G06F 17/17* (2013.01)

(58) Field of Classification Search
CPC ........ G01K 1/022; G01K 15/007; G01K 3/04; G01K 7/42; G06F 17/17
See application file for complete search history.

(56) References Cited

U.S. PATENT DOCUMENTS

| | | | |
|---|---|---|---|
| 9,594,357 B2 * | 3/2017 | Endou | G05B 13/02 |
| 2005/0071401 A1 * | 3/2005 | Clifton | G06F 1/0356 |
| | | | 708/290 |
| 2009/0290484 A1 | 11/2009 | Painchault et al. | |

(Continued)

FOREIGN PATENT DOCUMENTS

| | | |
|---|---|---|
| JP | S58-092941 A | 6/1983 |
| JP | H05-284692 A | 10/1993 |

(Continued)

OTHER PUBLICATIONS

An Office Action; "Notice of Reasons for Refusal", mailed by the Japanese Patent Office dated Jun. 8, 2021, which corresponds to Japanese Patent Application No. 2019-048473 and is related to U.S. Appl. No. 16/814,173; with English language translation.

(Continued)

*Primary Examiner* — Kyle R Quigley
(74) *Attorney, Agent, or Firm* — Studebaker & Brackett PC

(57) ABSTRACT

A temperature interpolation device includes: a temperature data reading/writing unit which continues to record both time information and temperature data in a nonvolatile storage medium in the operation of a target device whose temperature data is read, and which checks the time information recorded in the nonvolatile storage medium at predetermined time intervals so as to determine whether or not data is lost in a predetermined time section; and a past temperature estimation unit which uses, when the temperature data reading/writing unit determines that the data is lost, the data recorded in the nonvolatile storage medium and a calculation parameter recorded in a calculation parameter setting unit so as to estimate and interpolate the lost data with a temperature interpolation formula.

1 Claim, 9 Drawing Sheets

(56) References Cited

U.S. PATENT DOCUMENTS

| | | | | |
|---|---|---|---|---|
| 2012/0095303 A1* | 4/2012 | He | ..................... | A61B 5/14532 |
| | | | | 600/301 |
| 2016/0305848 A1* | 10/2016 | Boggio | .................. | G06Q 10/20 |
| 2016/0334437 A1* | 11/2016 | Nishida | ................... | G01P 1/127 |
| 2017/0185063 A1* | 6/2017 | Suzuki | ................. | G05B 19/406 |
| 2017/0323051 A1* | 11/2017 | Paquerault | ............. | G16B 40/00 |

FOREIGN PATENT DOCUMENTS

| | | | |
|---|---|---|---|
| JP | 2000-059349 | A | 2/2000 |
| JP | 2003-037512 | A | 2/2003 |
| JP | 2004148443 | A | 5/2004 |
| JP | 2008-298757 | A | 12/2008 |
| JP | 2014-181955 | A | 9/2014 |
| JP | 2016-212066 | A | 12/2016 |
| JP | 2017144527 | A | 8/2017 |
| JP | 2018120785 | A | 8/2018 |
| JP | 2019-507322 | A | 3/2019 |

OTHER PUBLICATIONS

An Office Action mailed by the Japanese Patent Office dated Dec. 7, 2021, which corresponds to Japanese Patent Application No. 2019-048473 and is related to U.S. Appl. No. 16/814,173; with English language translation.

* cited by examiner

TEMPERATURE INTERPOLATION DEVICE

This application is based on and claims the benefit of priority from Japanese Patent Application No. 2019-048473, filed on 15 Mar. 2019, the content of which is incorporated herein by reference.

BACKGROUND OF THE INVENTION

Field of the Invention

The present invention relates to temperature interpolation devices.

Related Art

Conventionally, a method of compensating for a thermal displacement is known (see, for example, patent document 2). Patent document 2 discloses that "n a method of compensating for a thermal displacement in a machine tool according to the present invention, a compensation value obtained by performing an operation based on a history value of measurement data of a machine temperature and a delay value of heat transfer is used to compensate for a feed command in an NC device, and thus the position of a tool which is in the middle of machining a workpiece is compensated for".

A method of compensating for a thermal displacement in a tool is also known (see, for example, patent document 3). Patent document 3 discloses that "in a method of compensating for a thermal displacement in a tool according to the invention of claim 1, a first machine tool temperature near the bearing of a spindle and a second machine tool temperature of part where the thermal stability of a machine tool is high are measured, the amount of thermal displacement in the tool is estimated from a predetermined linear delay formula based on a difference between the first machine tool temperature and the second machine tool temperature and thus an estimated compensation amount is used to compensate for the position of the tool".

However, in the conventional technologies as described above, it is desired that when a loss in temperature data is caused by a power failure, a network failure or the like, the temperature data lost in the past can be referenced.

On the other hand, a method of interpolating lost data is known (see, for example, patent document 1). Patent document 1 discloses "As a measure for preventing a reduction in the estimation accuracy of a deteriorated state, when a loss in the record d of temperature history data D1 is caused, it can be considered that the temperature Tb of a secondary battery 110 in a normal period before and after a loss period is used so as to interpolate the temperature Tb in the loss period. Although various methods are present as a method of interpolating data, FIG. 4 shows an example of linear interpolation".

Patent Document 1: Japanese Unexamined Patent Application, Publication No. 2018-120785
Patent Document 2: Japanese Unexamined Patent Application, Publication No. 2017-144527
Patent Document 3: Japanese Unexamined Patent Application, Publication No. 2004-148443

SUMMARY OF THE INVENTION

A temperature interpolation device is desired that can appropriately interpolate temperature data in a period during which the temperature data is lost in the operation of a machine tool.

(1) One aspect of the present disclosure relates to a temperature interpolation device that includes: a calculation parameter setting unit which records a previously selected calculation parameter for a temperature interpolation formula so as to interpolate temperature data that is lost; a temperature data reading/writing unit which continues to record both time information and temperature data in a nonvolatile storage medium is the operation of a target device whose temperature data is read, and which checks the time information recorded in the nonvolatile storage medium at predetermined time intervals so as to determine whether or not data is lost in a predetermined time section; and a past temperature estimation unit which uses, when the temperature data reading/writing unit determines that the data is lost, the data recorded in the nonvolatile storage medium and the calculation parameter recorded in the calculation parameter setting unit so as to estimate and interpolate the lost data with the temperature interpolation formula.

According to the one aspect, it is possible to provide a temperature interpolation device that can appropriately interpolate temperature data in a period during which the temperature data is lost in the operation of a machine tool.

DETAILED DESCRIPTION OF THE INVENTION

Figure 1:
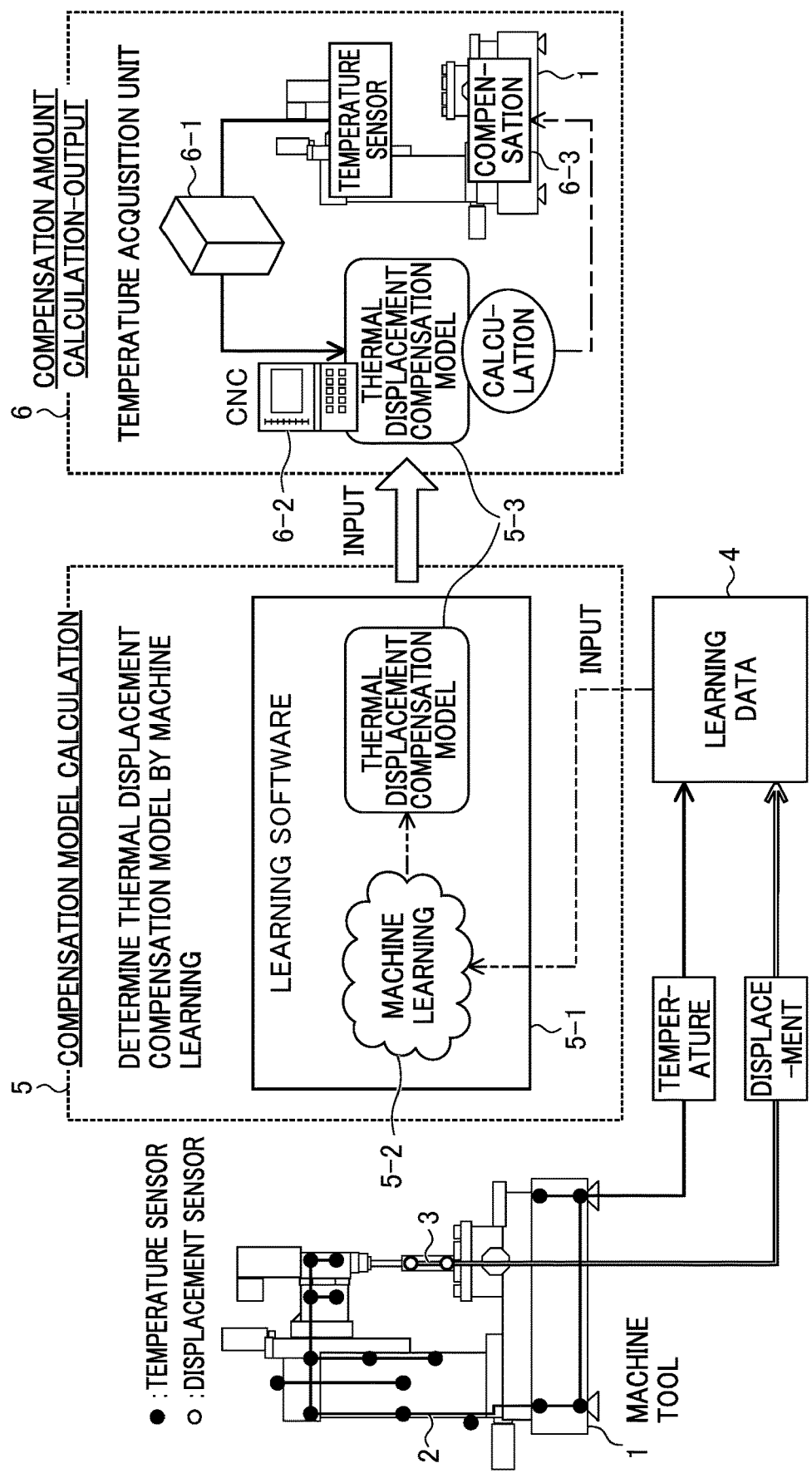
FIG. 1 is a diagram showing the configuration of a first embodiment.
Figure 2:
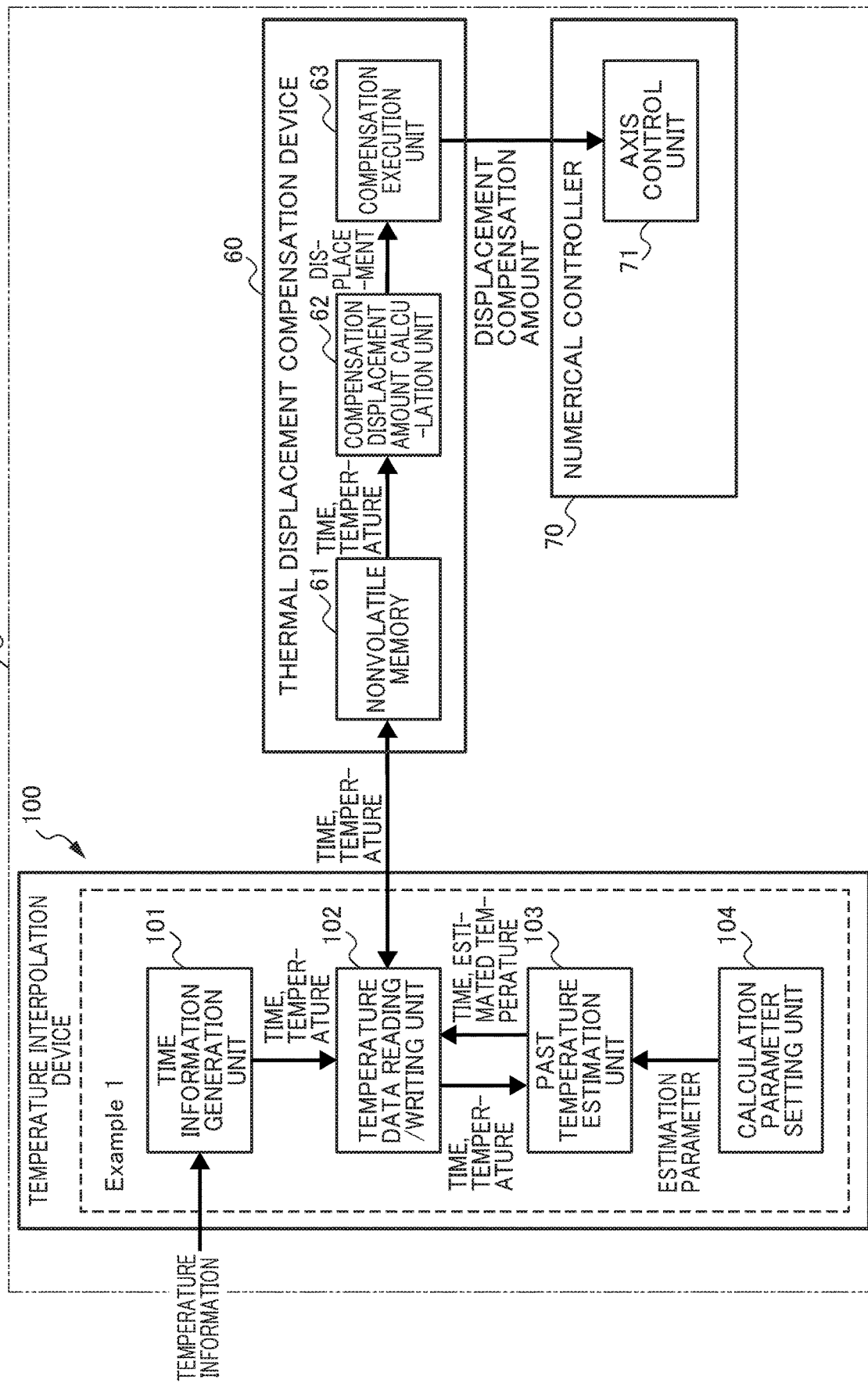
FIG. 2 is a block diagram showing a temperature interpolation device, a thermal displacement compensation device and a numerical controller in the first embodiment.
Figure 3:
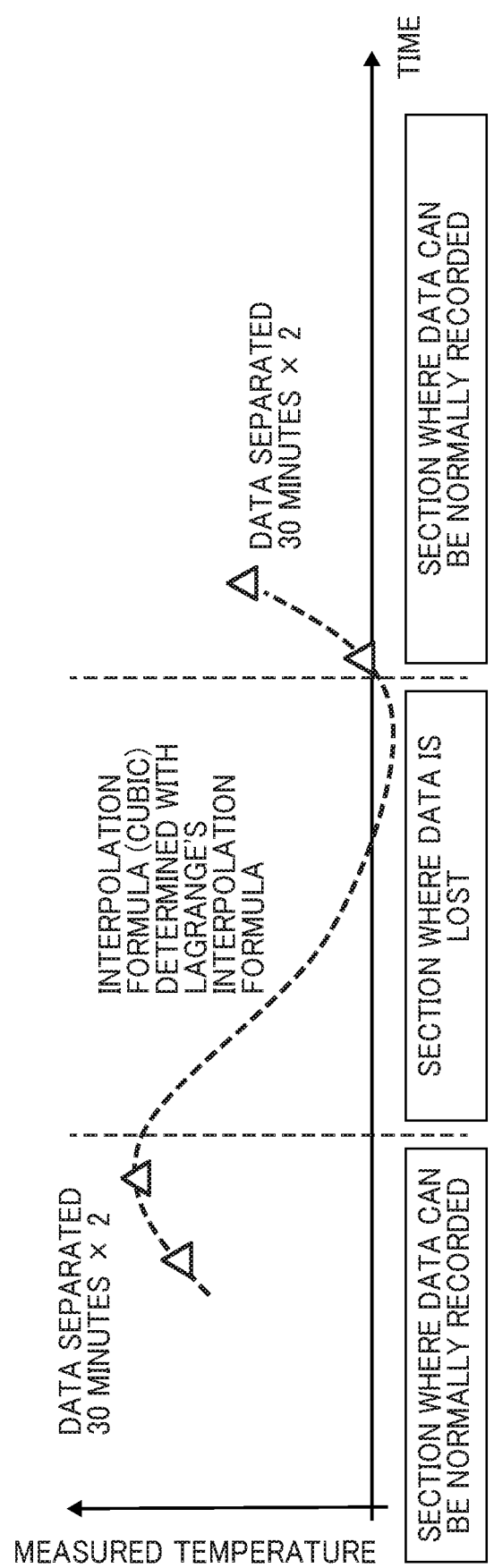
FIG. 3 is a diagram illustrating a loss in temperature data which is interpolated in the first embodiment.
Figure 4:
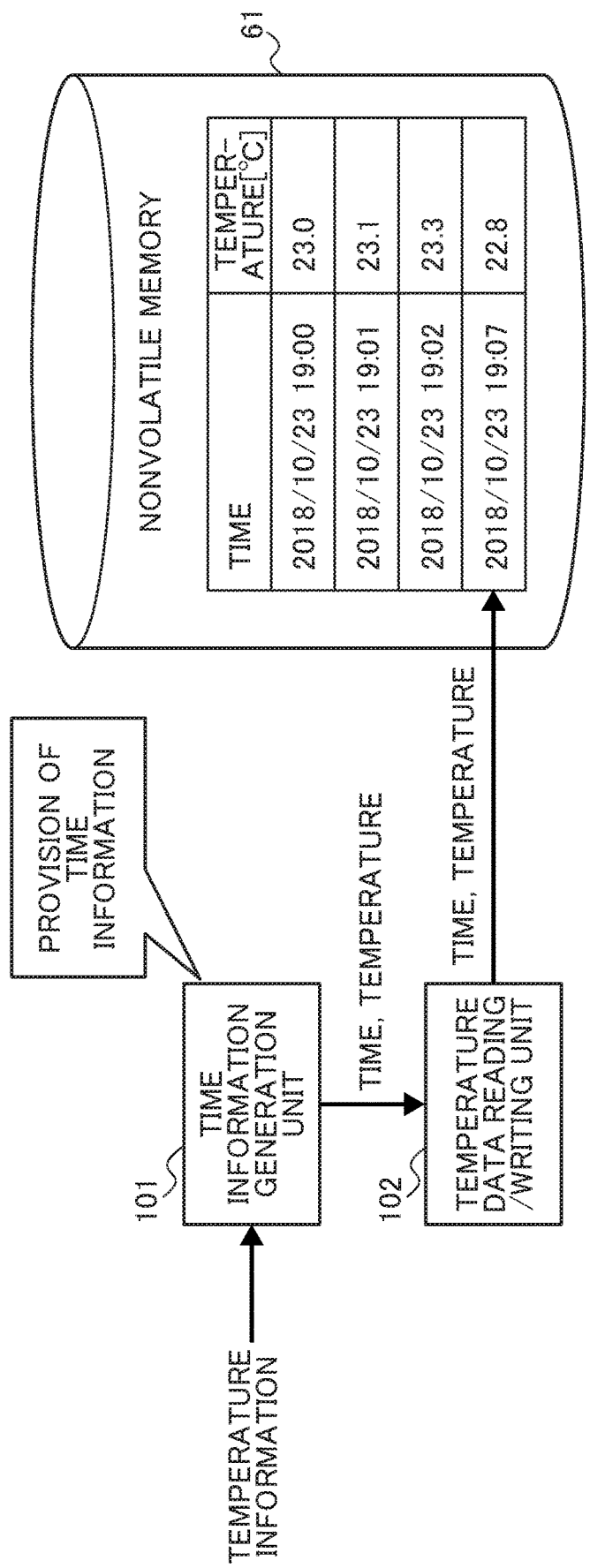
FIG. 4 is a diagram illustrating the recording of acquired temperature data in a nonvolatile memory in the first embodiment.
Figure 5:
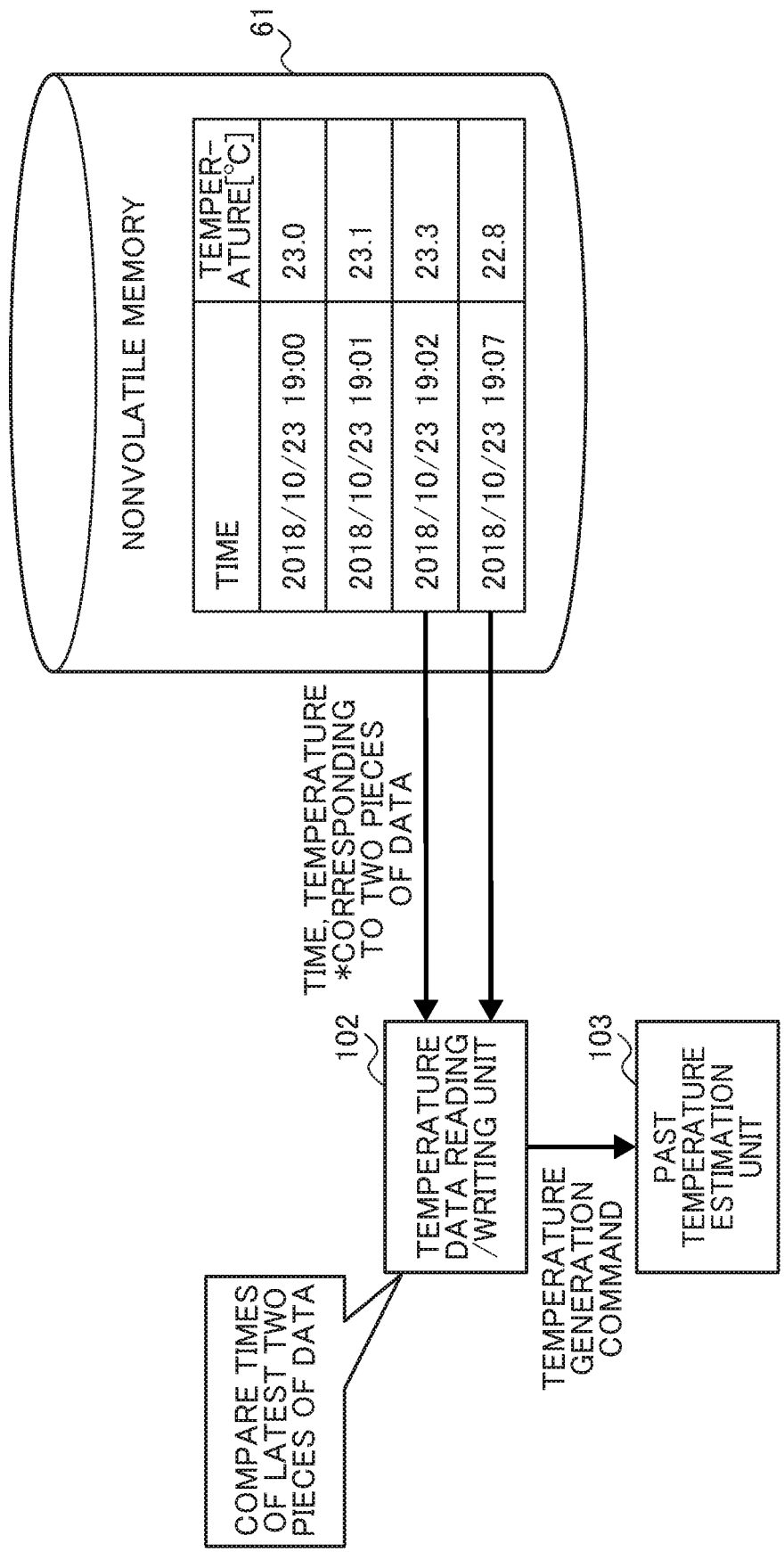
FIG. 5 is a diagram illustrating a determination as to whether or not a loss in the temperature data is caused in the first embodiment.
Figure 6:
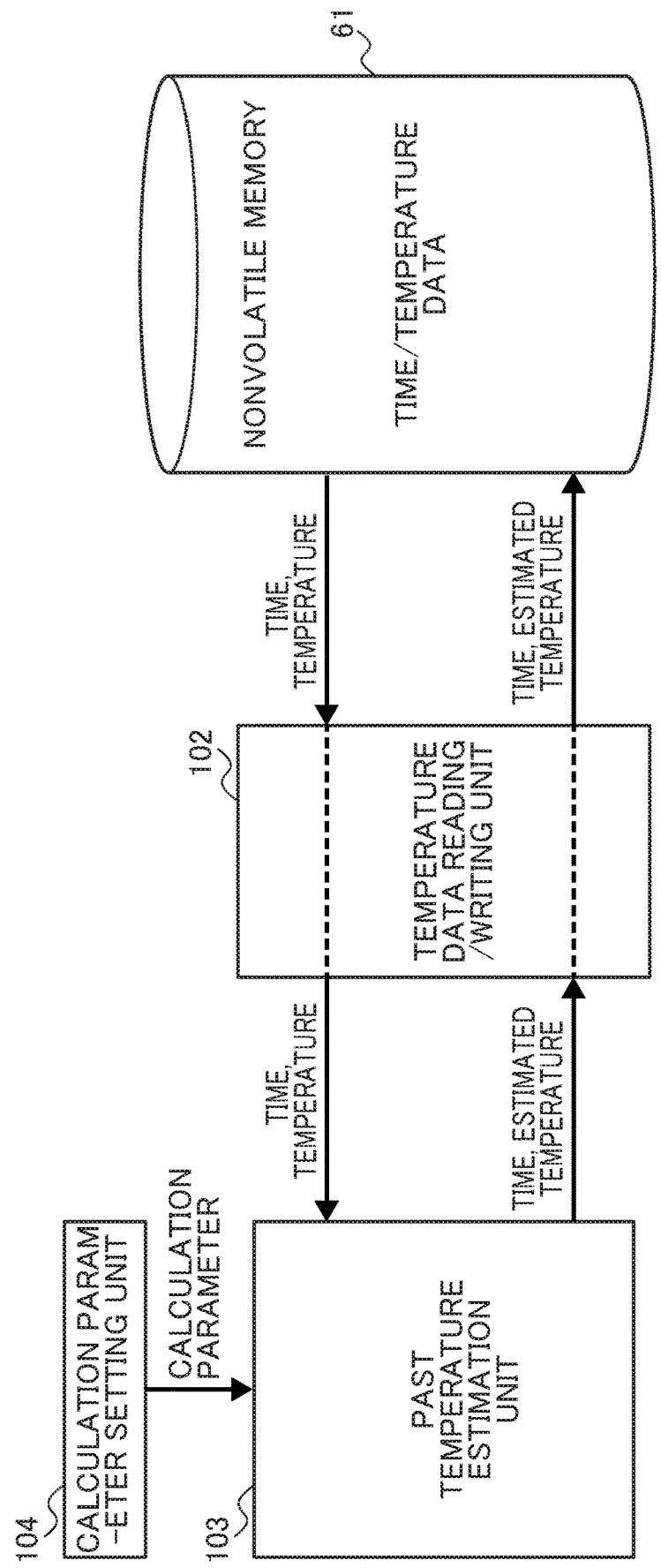
FIG. 6 is a diagram illustrating the estimation and the interpolation of the lost data in the first embodiment.
Figure 7:
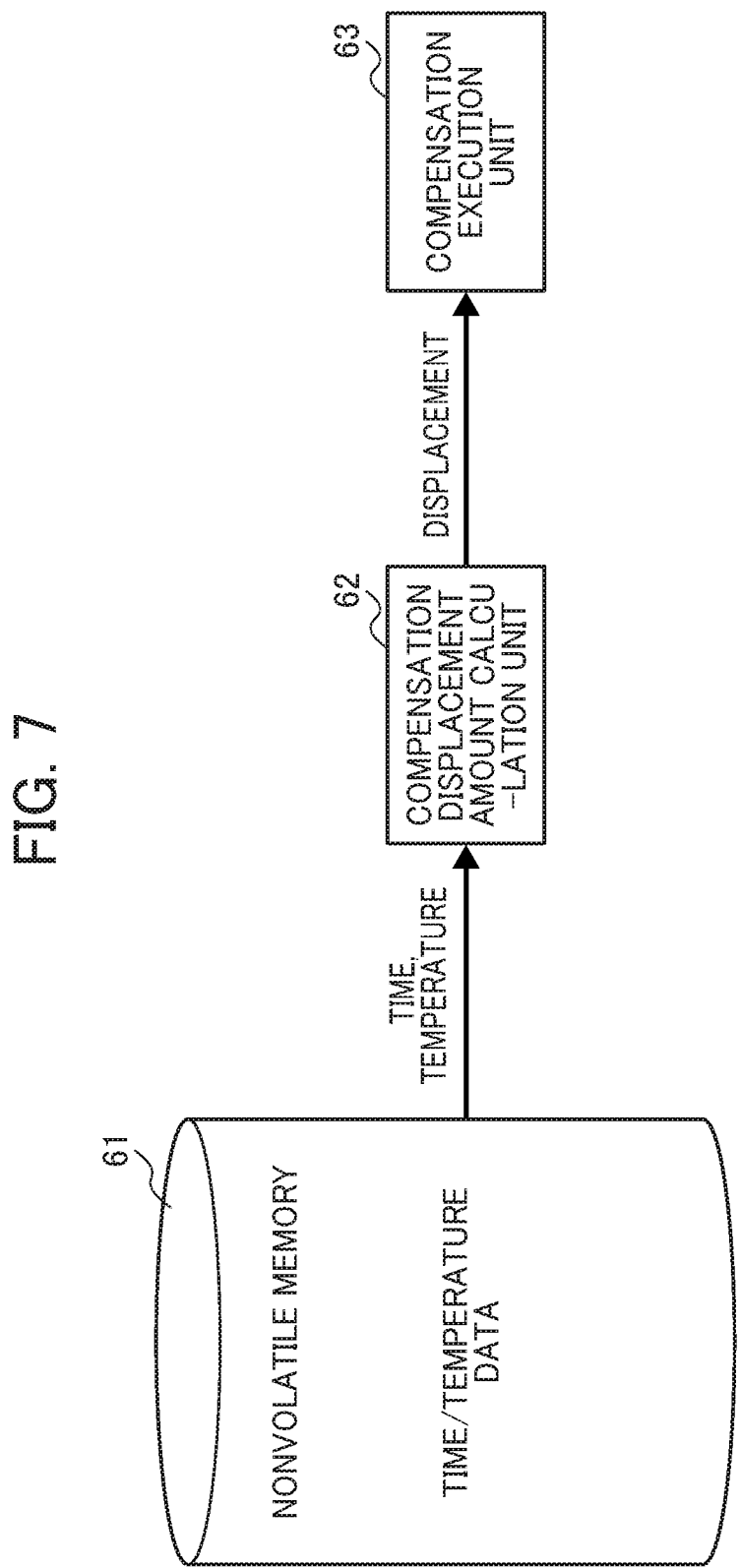
FIG. 7 is a diagram illustrating thermal displacement compensation based of the temperature data recorded in the nonvolatile memory performed with a compensation displacement amount calculation unit in the first embodiment.

A temperature interpolation device 100 according to a first embodiment of the present disclosure will be described below with reference to FIGS. 1 to 7. FIG. 1 is a diagram showing the entire configuration including a machine tool 1. FIG. 2 is a block diagram showing the temperature interpolation device 100, a thermal displacement compensation device 60 and a numerical controller 70. FIG. 3 is a diagram illustrating a loss in temperature data which is interpolated. FIG. 4 is a diagram illustrating the recording of acquired temperature data in a nonvolatile memory 61. FIG. 5 is a diagram illustrating a determination as to whether or not a loss in the temperature data as caused. FIG. 6 is a diagram illustrating the estimation and the interpolation of lost data. FIG. 7 is a diagram illustrating thermal displacement compensation using a compensation displacement amount calculation unit based on the temperature data recorded in the nonvolatile memory 61.

An overall outline including the temperature interpolation device 100 will first be described. The temperature interpolation device 100 is included in a configuration which has a thermal displacement compensation function of estimating a thermal displacement from a thermal displacement compensation model and temperature data on the thermal displacement of the machine tool 1 so as to add a compensation amount corresponding to the thermal displacement to an axis movement amount. In this configuration, for example, the thermal displacement compensation model is produced by use of machine learning, and the compensation amount is calculated from the thermal displacement compensation model and an operation state data (such as the temperature data). Then, when a difference between an estimated value and an actual measured value is not equal to or less than a threshold value, the thermal displacement compensation model is calculated again.

Specifically, as shown in FIG. 1, in the machine tool 1, temperature sensors 2 and displacement sensors 3 are provided, and thus it is possible to detect temperatures and displacements. Here, as the machine tool 1, various machine tools are included, and examples thereof include a machining center (having an x axis, a y axis and a z axis), a lathe (having only an x axis and a z axis) and the like.

The temperatures and the displacements detected are used as learning data 4, and thus a compensation model calculation 5 is executed. The compensation model calculation 5 refers to calculation processing for determining a thermal displacement compensation model 5-3 by machine learning. Specifically, the compensation model calculation 5 is calculation processing in which learning software 5-1 performs the machine learning 5-2 based on the learning data 4 so as to produce the thermal displacement compensation model 5-3. The learning software 5-1 may be executed on a predetermined computer. The learning data 4 may be data which is previously acquired before work.

Then, the determined thermal displacement compensation model 5-3 is utilized, and thus in the actual work process, compensation amount calculation-output 6 is executed. The compensation amount calculation-output 6 may be executed with, for example, a CNC (Computerized Numerical Control) device 6-2. The CNC device 6-2 calculates and outputs an instruction (axis movement amount) to the machine tool 1, utilizes, at that time, the thermal displacement compensation model 5-3 so as to calculate a compensation amount and adds it to the axis movement amount. The axis movement amount for which the CNC device 6-2 compensates as described above is output to the machine tool 1. In this way, the machine tool 1 executes an operation according to the axis movement amount which has been subjected to the compensation 6-3. On the other hand, in the machine tool 1, the temperature sensors 2 are provided, and a temperature acquisition unit 6-1 reads temperatures from the temperature sensors 2 and supplies them to the CNC device 6-2. The CNC device 6-2 utilizes, based on the supplied temperatures, the thermal displacement compensation model 5-3 so as to execute the compensation amount calculation-output 6.

Thereafter, the same processing is repeated. In this way, it is possible to perform the work which is unlikely to be affected by heat.

More specifically, as shown in FIG. 2, the thermal displacement compensation function is realized by the thermal displacement compensation device 60 and the numerical controller 70. The thermal displacement compensation device 60 includes the nonvolatile memory 61 serving as a nonvolatile storage medium, a compensation displacement amount calculation unit 62 and a compensation execution unit 63. The numerical controller 70 includes an axis control unit 71. Each time the temperature data is read and acquired with the temperature sensors 2 at each time, the nonvolatile memory 61 records the temperature data such that the temperature data is associated with time information. When the thermal displacement compensation function is executed, the thermal displacement compensation model for estimating the thermal displacement and the operation state data having a correlation with the thermal displacement are recorded.

The compensation displacement amount calculation unit 62 calculates the compensation amount from the operation state data (such as the temperature data) and the compensation model, and supplies the compensation amount to the compensation execution unit 63. The compensation execution unit 63 supplies the compensation amount corresponding to the temperatures to the axis control unit 71.

The axis control unit 71 is a unit which outputs a command to the machine tool 1, and basically supplies the command based on a machining program to the machine tool 1 in the system thereof. Here, axis control information in the system thereof is utilized, and thus the execution is performed. The compensation amount corresponding to the temperatures is received from the compensation execution unit 63, the compensation amount is added to the command and then the command is supplied to the machine tool 1.

When a loss is caused in the temperature data read at each time with the temperature sensors 2 of the machine tool 1, the temperature interpolation device 100 interpolates the part of the data which is lost, and outputs the interpolated temperature data to the thermal displacement compensation device 60 together with the data of the time read with the temperature sensors 2.

Specifically, as shown in FIG. 2, the temperature interpolation device 100 includes a time information generation unit 101, a temperature data reading/writing unit 102, a past temperature estimation unit 103 and a calculation parameter setting unit 104. It is known that in predetermined parts in which the temperature sensors 2 of the machine tool 1 in the present embodiment are provided, variations in the temperatures read with the temperature sensors 2 follow a cubic formula. This is used as a precondition, and the temperature data in a section in which the temperature data is lost is interpolated as follows.

First, for example, as shown in FIG. 3, when the temperature data in a section ("section where the data is lost" in the center) from a time immediately after the temperature starts to drop until a time immediately after the temperature thereafter starts to rise is lost due to a power failure, a network failure or the like, a cubic formula which has the temperature data in such a section as a predetermined parameter is determined by use of Lagrange's interpolation formula. Then, with the determined cubic formula, the value of the temperature data in the section in which the temperature data is lost is interpolated.

Specifically, Lagrange's interpolation formula with respect to data (x1, y1), (x2, y2), (x3, y3), ..., (xn, yn) of n pairs of times x and temperatures y is given by the following formulas.

$$y = \sum_{k=1}^{n} \frac{P_k(x)}{P_k(x_k)} y_k \qquad \text{[Math. 1]}$$

$$P_k(x) = \frac{\prod_{k=1}^{n}(x - x_i)}{(x - x_k)} \qquad \text{[Math. 2]}$$

Here, a third-order polynomial can be determined by data of four points (four pairs). Although the times of the pieces of data are preferably somewhat separated from each other, when the times are excessively close to each other, the amount of change in temperatures is low whereas when the times are excessively distant from each other, the reliability of the temperature data is lowered. Hence, the calculation parameter setting unit 104 records the following requirements for interpolation as calculation parameters used in the interpolation of the temperature data.
[Requirements for interpolation]
Interpolation formula: Lagrange's interpolation formula
Order: third order
Number of pieces of data used in interpolation: 4
Distance between pieces of data used in interpolation: 30 minutes Each time the temperature data is read and acquired at each time with the temperature sensors 2, the time information generation unit 101 generates the time information. The temperature data reading/writing unit 102 records, in the nonvolatile memory 61 of the thermal displacement, compensation device 60, the acquired temperature data and the time information generated in the time information generation unit 101 such that the temperature data and the time information are associated with each other. Specifically, for example, as shown in FIG. 4, the temperatures are read and acquired with the temperature sensors 2 at intervals of one minute, and the times and the temperatures are paired with the temperature data reading/writing unit 102 so as to have a one-to-one relationship and are recorded in the nonvolatile memory 61.

Simultaneously therewith, the temperature data reading/writing unit 102 checks the time information on the nonvolatile memory 61 at regular intervals so as to determine whether or not lose; data is generated. Specifically, as shown in FIG. 5, the temperature data reading/writing unit 102 reads, from the nonvolatile memory 61, two pieces of data closest to the current time (hereinafter referred to as the "latest data" and the "second latest data"), and compares the times. When the interval of the times of the two pieces of data which are read is a predetermined time or more distant from a predetermined temperature data acquisition interval, it is determined that lost data is generated (the section shown in FIG. 3 where the data is lost), and as shown in FIG. 5, an estimation temperature generation command is fed to the past temperature estimation unit 103.

More specifically, in the nonvolatile memory 61 of FIGS. 4 and 5, the temperatures are read and acquired with the temperature sensors 2 at intervals of one minute, and the times at which the temperatures are read and the read temperatures are paired with the temperature data reading/writing unit 102 so as to have a one-to-one relationship and are recorded in the nonvolatile memory 61. Here, in 5 minutes between a time "2018/10/23 19:02" and a time "208/10/23 19:07", the time information and the temperature data are not present. When as described above, in the 5 minutes during which the interval is distant so as to be more than the predetermined interval of 1 minute and equal to or more than 2 minutes, a loss in the temperature data is generated, the temperature data reading/writing unit 102 determines, as shown in FIG. 5, that lost data is generated, with the result that the temperature data reading/writing unit 102 feeds the estimation temperature generation command to the past temperature estimation unit 103. As a determination formula here, for example, the following formula is used:

$$T_t - T_{t-1} \geq \text{SamplingRate+thresh} \qquad \text{[Math 3]}$$

(Tt: latest data time, SamplingRate: data acquisition interval, thresh: arbitrary threshold value).

When the temperature data reading/wilting unit 102 determines that lost data is generated, as shown in FIG. 6, the past temperature estimation unit 103 uses the times and the temperature data left in the nonvolatile memory 61 and the calculation parameters recorded in the nonvolatile memory 61 so as to estimate, with Lagrange's interpolation formula, the temperature data of the time which is lost. Then, the past temperature estimation unit 103 commands the temperature data reading/writing unit 102 to record the estimated temperature data in the nonvolatile memory 61. In this way, the temperature data reading/writing unit 102 records the temperature data of the time lost in the nonvolatile memory 61 so as to interpolate the temperature data.

In the configuration described above, for the temperatures obtained with the temperature sensors 2, it is detected that the data obtained from the temperature sensors 2 is lost in the predetermined time section, and thus the temperature data in the predetermined time section where the data is lost is interpolated. Then, based on the temperature data obtained from the temperature sensors 2, the temperature data interpolated with the temperature interpolation device 100 and the thermal displacement compensation model, as shown in FIG. 7, the compensation displacement amount calculation unit 62 estimates the thermal displacement, and thus the compensation execution unit 63 executes the thermal displacement compensation function of adding the compensation amount corresponding to the thermal displacement to the axis movement amount.

The present embodiment described above achieves the following effects. In the present embodiment, the temperature data reading/writing unit 102 continues to record both the time information and the temperature data in the nonvolatile memory 61 in the operation of the machine tool 1 serving as a target device whose temperature data is read, and checks the time information recorded in the nonvolatile memory 61 at predetermined time intervals so as to determine whether or not data is lost in the predetermined time section. In this way, it is possible to interpolate the temperature data in the period (section) during which the temperature data is lost in the operation of the machine tool 1.

In the present embodiment, the past temperature estimation unit 103 uses, as the temperature interpolation formula, Lagrange's interpolation formula using the calculation parameters so as to estimate the lost data based on the temperature data. In this way, when a temperature rise and a temperature drop follow a cubic formula, it is possible to highly accurately interpolate the temperature data with consideration given to the thermal characteristics of parts of the machine tool 1 where the temperature sensors 2 are provided, with the result that it is possible to perform highly accurate thermal displacement interpolation.

Figure 8:
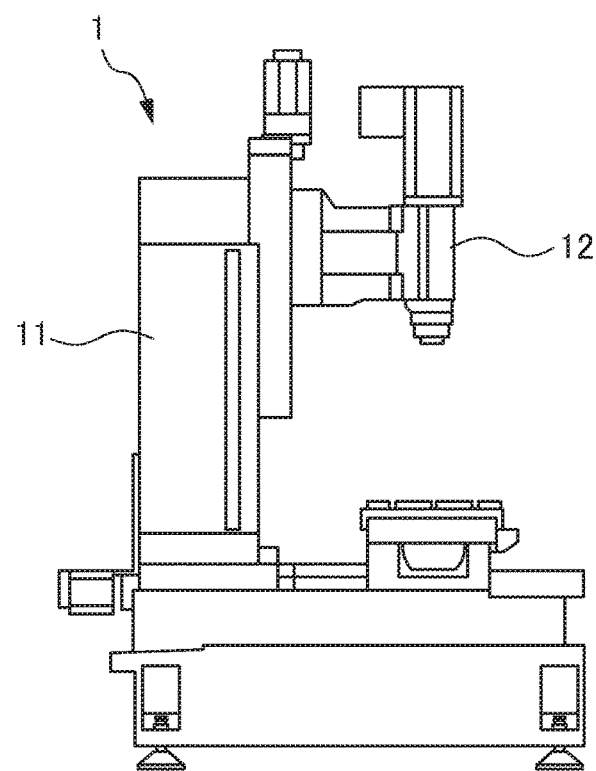
FIG. 8 is a diagram illustrating a difference in time constant depending on positions to which temperature sensors are attached in a second embodiment.
Figure 9:
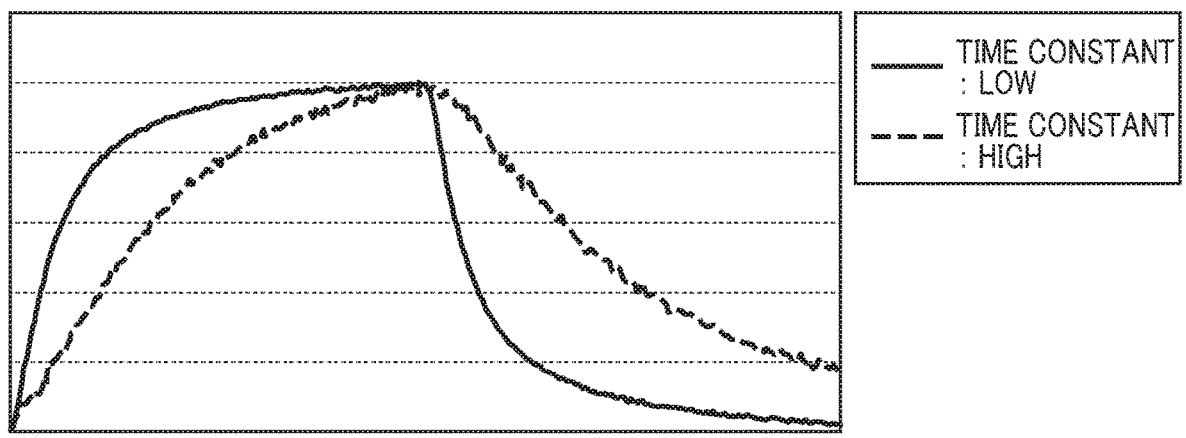
FIG. 9 is a graph illustrating a difference between a temperature rise and a temperature drop caused by a difference in the time constant in the second embodiment.
Figure 10:
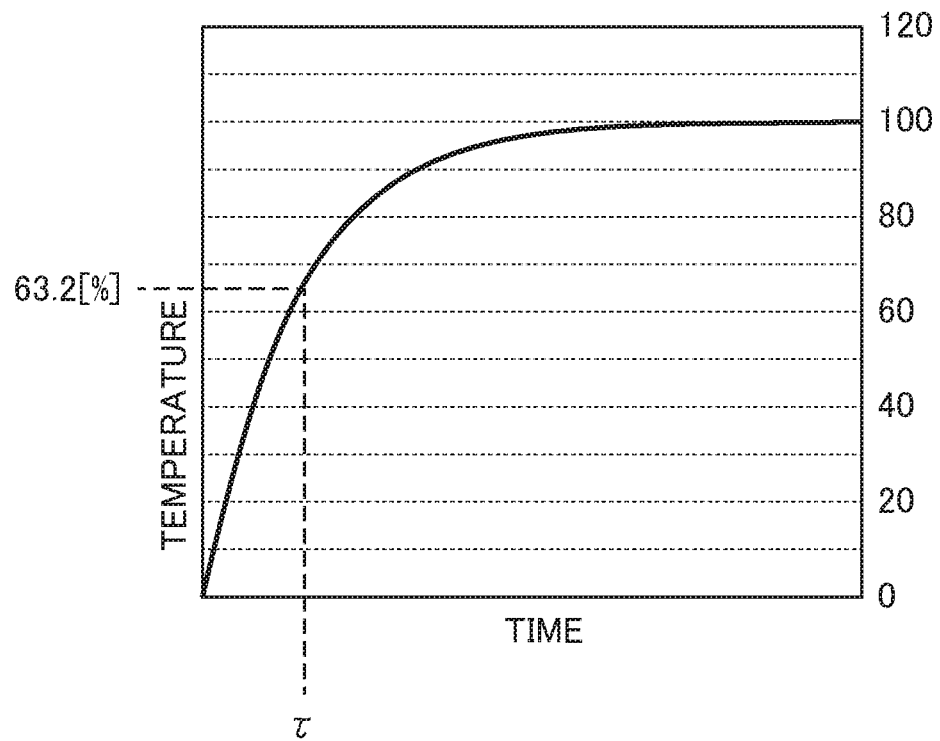
FIG. 10 is a diagram illustrating the calculation of a parameter for a temperature rise curve in the second embodiment.

A second embodiment of the present disclosure will then be described. The second embodiment differs from the first embodiment in that when the time constant of a temperature change is high depending on the positions of the machine tool 1 where the temperature sensors 2 are provided, the lost data is interpolated with an exponential function. Since the other configurations of the second embodiment are the same as those of the first embodiment, the description of the same configurations as in the first embodiment will be omitted. FIG. 8 is a diagram illustrating a difference in the time constant depending on positions to which the temperature sensors 2 are attached. FIG. 9 is a graph illustrating a difference between a temperature rise and a temperature drop caused by the difference in the time constant. FIG. 10 is a diagram illustrating the calculation of a parameter for a temperature rise curve.

As shown in FIG. 8, in the machine tool 1, part 11 whose time constant is high and part 12 whose time constant, is low are present. As shown in FIG. 9, the shape of a curve indicating the transition of a temperature change significantly differs depending on the magnitude of the time constant, and in particular, for example, when the user of the machine tool 1 stops the operation of the machine tool 1 and then restarts the operation, the values of displacements obtained with the displacement sensors 3 are varied. Hence, in order to highly accurately estimate the temperature data which is lost, it is necessary to consider the time constant.

Specifically, temperature rise data on each of a plurality of temperature sensors 2 in the machine tool 1 is previously acquired, and a decay constant λ is determined. As shown in FIG. 10, it is assumed that a saturation temperature value when the temperature rises is 100% and that a time until the temperature reaches a temperature of 63.2% is T, and thus the decay constant λ which is a positive number is determined from a relational formula below:

$$\lambda = /\tau.$$

The determined λ is previously recorded in the calculation parameter setting unit 104 so as to be associated with the individual temperature sensors 2.

It is known that in the predetermined part in which the temperature sensor 2 of the machine tool 1 in the present embodiment is provided and whose time constant is high, the transition of the temperature read with the temperature sensor 2 is a general exponential temperature transition. For example, when the temperature drops, this process is mathematically represented by a differential equation below:

$$dN/dt = -\lambda N(t)$$

where N (t) is an attenuation amount at a time t. The differential equation is solved so as to have an exponential function below:

$$N(t) = N_0 e^{-\lambda t}$$

where $N_0$ is an initial value. The differential equation is transformed into the following equation:

$$N(t) = N_0 e^{-\lambda t} + N_\infty$$

where $N_\infty$ is assumed to be the limit value of the temperature. The initial value $N_0$ and the limit value $N_\infty$ are defined as below.

$N_0$=temperature of latest data−temperature or second latest data $N_\infty$=temperature of second latest data(temperature of new data subsequent to the latest data)

The present embodiment described above achieves the following effect. In the present embodiment, in the temperature rise based on the previously acquired temperature rise data, the past temperature estimation unit 103 uses, as the temperature interpolation formula, the exponential function using the calculation parameter based on the time until the temperature of a predetermined ratio with respect to the saturation temperature value is reached from a rise start temperature value of 0° C. so as to estimate the lost data based on the temperature data. In this way, not only in the case of the attenuation (drop) of the temperature but also in the case of the increase (rise) thereof, the lost temperature data can be estimated so as to be a smooth curve.

The present embodiments have been described above. Although the embodiments described above are preferred embodiments, the present invention is not limited to only the embodiments described above, and embodiments on which various modifications are made can be practiced. For example, variations which will be described below can be practiced.

Specifically, the configurations of the calculation parameter setting unit, the temperature data reading/writing unit, the past temperature estimation unit and the like are not limited to the configurations of the calculation parameter setting unit 104, the temperature data reading/writing unit 102, the past temperature estimation unit 103 and the like in the embodiments described above. The configurations of the thermal displacement compensation device for executing the thermal displacement compensation function, the numerical controller and the like are not limited to the configurations of the thermal displacement compensation device 60 including the nonvolatile memory 61, the compensation displacement amount calculation unit 62 and the compensation execution unit 63, the numerical controller 70 including the axis control unit 71 and the like. Although Lagrange's interpolation formula is used as the temperature interpolation formula, there is no limitation to this configuration. Although the temperature data follows the cubic function or the exponential function, there is no limitation to this configuration. Although in the embodiments described above, the nonvolatile memory 61 is used as the nonvolatile storage medium, there is no limitation to this configuration. Although in the embodiments described above, the rise start temperature value is 0° C., there is no limitation to this configuration.

EXPLANATION OF REFERENCE NUMERALS

61 nonvolatile memory (nonvolatile storage medium)
100 temperature interpolation device
102 temperature data reading/writing unit
103 past temperature estimation unit
104 calculation parameter setting unit

What is claimed is:

1. A temperature interpolation device of a CNC machine tool comprising a processor and at least one temperature sensor, the processor being configured to:
    record a previously selected calculation parameter for a temperature interpolation formula to interpolate temperature data that has been lost;
    record both time information and temperature data acquired by the at least one temperature sensor in a nonvolatile storage medium at a predetermined interval during an operation of the CNC machine tool whose temperature data is read;
    check the time information recorded in the nonvolatile storage medium at predetermined time intervals;

determine that data has been lost when an interval between two consecutive temperature data closest to current time exceeds the predetermined interval;
when it is determined that the data has been lost, use the data recorded in the nonvolatile storage medium and the recorded calculation parameter to estimate and interpolate the lost data with the temperature interpolation formula;
estimate a thermal displacement based on the interpolated lost data; and
add a compensation amount corresponding to the estimated thermal displacement to a movement amount of an axis of the CNC machine tool,
wherein the processor uses, in a temperature rise based on previously acquired temperature rise data, an exponential function as the temperature interpolation formula to estimate the lost data based on the temperature data, the exponential function using the calculation parameter based on a time until a temperature of a predetermined ratio with respect to a saturation temperature value is reached from a rise start temperature value,
wherein the calculation parameter is a decay constant.

\* \* \* \* \*